July 9, 1929.  R. DE ROBILLARD  1,720,264
FLOTATION MACHINE FOR GRAPHITE AND OTHER MINERALS
Filed July 19, 1927
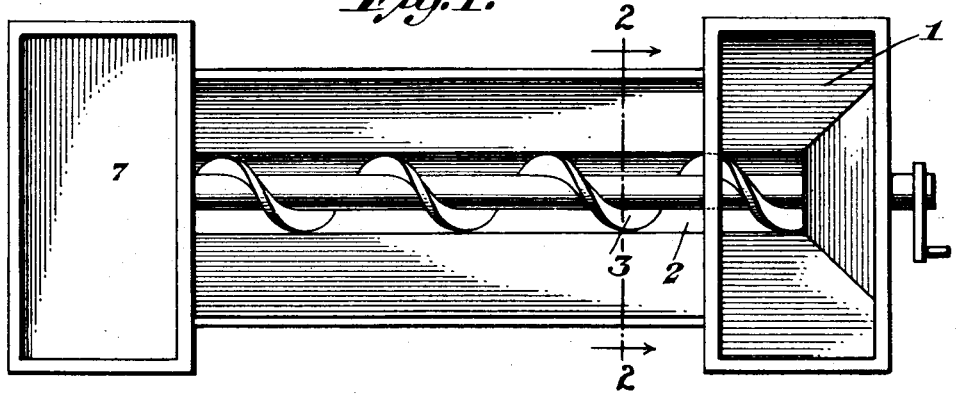
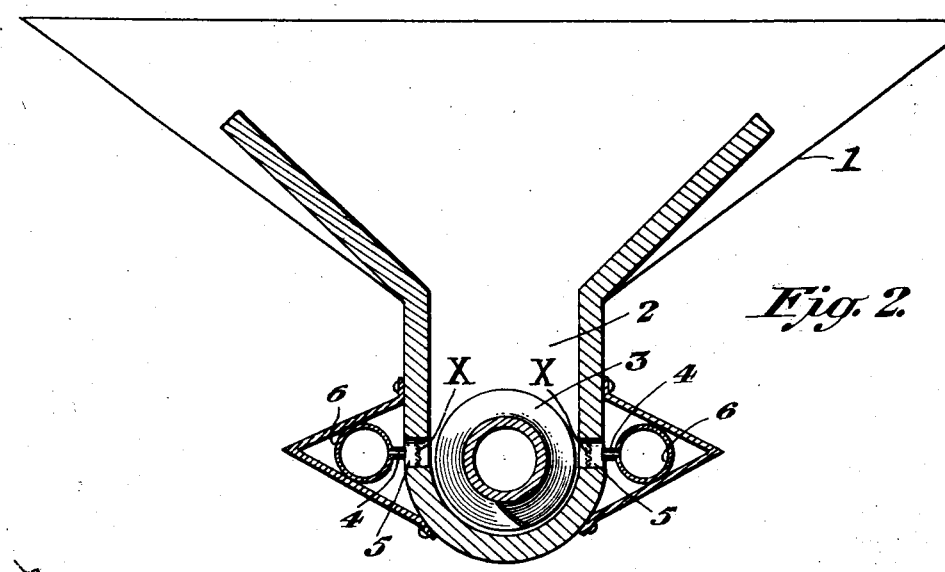

Patented July 9, 1929.

1,720,264

UNITED STATES PATENT OFFICE.

RÉGINALD DE ROBILLARD, OF TANANARIVE, MADAGASCAR.

FLOTATION MACHINE FOR GRAPHITE AND OTHER MINERALS.

Application filed July 19, 1927, Serial No. 207,002, and in France August 9, 1926.

My invention relates to a flotation machine in which the flotation is secured by introducing, into a vessel containing the material to be treated, water charged with fine bubbles of air, in the following way:

In the side or bottom of a vessel small openings or holes are made, through which fine jets of water, equal in number but slightly smaller than the said holes are driven: the jets forcing their way through the openings are accompanied by small bubbles of air which penetrate into the vessel and rise to the surface.

The jets may also, instead of entering directly into the holes, be directed against the side thereof and in the impact expand in a thin film and reach the adjacent holes into which the water rushes, drawing air in at the same time.

The openings can also be made larger in size but in that case covered by a sieve or any porous or filtering material against which the jets are directed.

In the practice, the ore to be treated, previously mixed with any suitable oil (mineral or vegetal) is submitted to the action of the jet of water and air inside the vessel.

The small bubbles of air attach themselves to the mineral and both together rise to the surface of the water and the mineral is then removed by over flow or any other suitable mechanical means.

I attain these objects by the disposition illustrated in the accompanying drawing in which Figure 1 is a plan view of the entire machine.

Figure 2 is a vertical section through the gutter taken on the plane of line 2—2 of Figure 1, and Figure 3 is a diagrammatic plan view of the water supply means in connection with the gutter and conveyor screw.

A crude ore bin is provided at 1 for the mineral to be treated and is connected to a gutter 2 in which an helicoidal screw 3 operates.

The gutter 2 is provided along both of its sides with openings 5 through which jets of water from nozzles 4 are admitted. The bottom wall of said gutter is semi-circular so as to conform to the periphery of the flight of the screw to insure movement of all ore which enters the gutter so that it will be effectively treated.

Opposite to the openings 5 and at a short distance from them, are water pipes 6 from which the nozzles 4 project.

A waste bin 7 communicates with the gutter 2 and receives the waste.

The openings 4 are preferably covered by reticulated material X to subdivide the water injected through the openings 4.

The mineral to be treated is put into the ore-bin 1 from which, by means of the screw 3, it is gradually transferred into the gutter 2 and submitted to the action of the water charged with fine bubbles of air. After a certain course in the gutter 2 the mineral is exhausted and the waste falls into the opposite bin 7.

The apparatus pictured in the accompanying drawing and described above is an application of features which may be applied in any other convenient way.

What I therefore claim is:

1. A flotation machine for graphite and other minerals comprising an ore bin, a gutter open at the top and with which the bin communicates and which is provided with a plurality of openings in its side, means for injecting water through said openings into the gutter and thus drawing air into the gutter, and a conveyer in the gutter for conveying the ore therethrough and discharging it therefrom, the bottom wall of the gutter substantially conforming to the general shape of and being relatively close to the conveyor.

2. A flotation machine for graphite and other minerals comprising an ore bin, a gutter open at the top and with which the bin communicates and which is provided with a plurality of openings in its side, means for injecting water through said openings into the gutter and thus drawing air into the gutter, and a screw conveyor for conveying the ore through the gutter and for mixing it with the air laden water injected into the gutter, the bottom wall of the gutter substantially conforming to the general shape of and being relatively close to the conveyor.

3. A flotation machine for graphite and other minerals comprising an ore bin, a gutter open at the top and with which the bin communicates and which is provided with a plurality of openings in its side, reticulated material placed over the openings, means for injecting water through said reticulated material and the openings into the gutter and thus drawing air into the gutter, said gutter having an arcuate bottom, and a conveyer in the gutter operating relatively close to said bottom for carrying the ore therethrough and discharging it therefrom.

RÉGINALD DE ROBILLARD.